United States Patent [19]
Lindenfelser et al.

[11] Patent Number: 5,579,453
[45] Date of Patent: Nov. 26, 1996

[54] SMART DIRECT MEMORY ACCESS CONTROLLER

[75] Inventors: William M. Lindenfelser, Rochester; Frederick A. Donahue, Walworth; Anthony E. Audi, Rochester, all of N.Y.

[73] Assignee: Xerox Corporation, Stamford, Conn.

[21] Appl. No.: 358,126

[22] Filed: Dec. 16, 1994

[51] Int. Cl.⁶ .................................................. G06K 15/00
[52] U.S. Cl. ........................................ 395/115; 395/502
[58] Field of Search ................................. 395/112, 115, 395/116, 162–166; 358/444, 404

[56] References Cited

U.S. PATENT DOCUMENTS

| | | | |
|---|---|---|---|
| 4,779,105 | 10/1988 | Thomson et al. | 346/154 |
| 4,992,958 | 2/1991 | Kageyama et al. | 395/116 |
| 5,016,190 | 5/1991 | Thomson | 364/518 |
| 5,084,831 | 1/1992 | Morikawa et al. | 395/116 |
| 5,108,207 | 4/1992 | Isobe et al. | 400/70 |
| 5,303,341 | 4/1994 | Rivshin | 395/162 |
| 5,307,458 | 4/1994 | Freiburg et al. | 395/162 |
| 5,481,669 | 6/1996 | Poulton et al. | 395/163 |

*Primary Examiner*—Arthur G. Evans
*Attorney, Agent, or Firm*—Daniel J. Krieger

[57] ABSTRACT

A smart direct memory access controller for data space transformation. The smart direct memory access controller can be used in computer systems to read and/or write data in a non-linear fashion in order to alter the organization of data stored within the computer system. The direct memory access controller has particular application in the electronic subsystem of a non-raster format electronic printer, such as a partial width array or full width array thermal ink jet printer. The smart direct memory access controller enables a non-raster format printer to access image organized in raster format, by viewing the data space as a non-linear or multi-dimensional memory. Memory addresses of the non-linear or multi-dimensional address space are a catenation of several data fields. Each field is one of the coordinates that defines the location of data within memory. In the smart direct memory access controller any one or more of the fields can increase when it comes time to increment the address, giving rise to data streams that are actually vectors through the data space.

25 Claims, 7 Drawing Sheets

SMART DIRECT MEMORY ACCESS CONTROLLER

FIELD OF THE INVENTION

This invention relates generally to the transfer of data stored in a memory to a peripheral device and more particularly relates to a smart direct memory access controller for interfacing between a device generating an output image and a partial width array printbar.

BACKGROUND OF THE INVENTION

An ink jet printer of the type frequently referred to as drop-on-demand, has at least one printhead from which droplets of ink are directed towards a recording medium. Within the printhead, the ink is contained in a plurality of channels. Piezoelectric devices or power pulses cause the droplets of ink to be expelled as required, from orifices or nozzles located at the end of the channels. In thermal ink-jet printing, the power pulses are usually produced by resistors, also known as heaters, each located in a respective one of the channels. The heaters are individually addressable to heat and vaporize the ink in the channels. As a voltage is applied across a selected heater, a vapor bubble grows in that particular channel and ink bulges from the channel nozzle. At that stage, the bubble begins to collapse. The ink within the channel then retracts and separates from the bulging ink thereby forming a droplet moving in a direction away from the channel nozzle and towards the recording medium whereupon hitting the recording medium, a spot is formed. The channel is then refilled by capillary action, which, in turn, draws ink from a supply container of liquid ink. Operation of a thermal ink jet printer is described in, for example, U.S. Pat. No. 4,849,774.

The ink jet printhead may be incorporated into a carriage type printer, a partial width array type printer, or a page width type printer. The carriage type printer typically has a relatively small printhead containing the ink channels and nozzles. The printhead is usually sealingly attached to a disposable ink supply cartridge and the combined printhead and cartridge assembly is attached to a carriage which is reciprocated to print one swath of information (equal to the length of a column of nozzles) at a time on a stationary recording medium, such as paper or a transparency. After the swath is printed, the paper is stepped a distance equal to the height of a printed swath or a portion thereof, so that the next printed swath is overlapping or contiguous therewith. The procedure is repeated until an entire page is printed. In contrast, the page width printer includes a stationary printbar having a length equal to or greater than the width of the paper. The paper is continually moved past the page width printbar in a direction substantially normal to the printbar length and at a constant or varying speed during the printing process.

The partial width array printer, on the other hand, typically includes one or more partial width arrays for printing in which each of the partial width arrays includes two or more printheads but less than a number of printheads sufficient to print across the entire width or length of a recording sheet. In this type of printer, the printheads are attached to a carriage assembly which is reciprocated back and forth across the surface of a sheet of paper which is attached to a rotating drum. During a single rotation of the drum, a band of information is printed along the sheet in the direction of the sheet travel. The carriage is then stepped across the sheet one length of the partial width arrays at a time so that the entire sheet is printed after a number of rotations equal to the number of steps necessary to complete a printed page.

Printers typically print information received from an image output device such as a personal computer. Typically, these output devices generate pages of information in which each page is written in a page description language. The pages written in the page description language are converted by the printer into bitmaps having a plurality of rows of scan lines.

Laser scanning xerographic printers have influenced the hardware organization of image output devices and the way in which the imaging software produces the bitmaps that are the data source for the laser scanners. In the traditional xerographic video system for a xerographic printer, the data that is sent to the laser scanner is organized in rasters, i.e., words of data of N bits represent the state of N successive pixels that the laser printer scans out across a page. Successive words transmitted to the laser scanner represent contiguous blocks of N pixels that form a full raster line across the page. The last word of data scanned out on a raster line is followed by the first word scanned out on the next line. While this type of operation works well for laser xerographic printers, thermal ink jet printers print in a very different fashion.

In a partial width array or a full width array printbar, a single line of pixels is typically printed in a burst of several banks of nozzles, each bank printing a segment of a line. The banks of nozzles are typically fired sequentially and the nozzles within a bank are fired simultaneously. An ink jet printbar having banks of nozzles is described in U.S. Pat. No. 5,300,968 to Hawkins incorporated herein by reference. These printbars include a plurality of printhead dies wherein each die prints a portion of a line. Within the die, the banks of nozzles print a segment of the portion of the line. Such printbars must be precisely oriented with respect to the process direction so that the printing of a last portion of a line, which is delayed in time from the printing of a first portion of a line, results in a line of pixels that is colinear. To accomplish acceptable printing using this type of printbar, the printbar is not aligned exactly perpendicular to the process direction, but is instead tilted with respect to the process direction. This means that each die prints on a portion of a different scan line.

Since the printbars are angled with respect to the process direction to compensate for the sequential firing of banks of nozzles, the bitmaps arranged in scan lines must be manipulated before printing can occur. This non-raster mode when printing is particularly complicated when compared to printing with a laser xerographic printer. The bitmaps arranged in scan lines cannot be printed raster line by raster line but instead must undergo some transformation. It is therefore important that the transformation be done in a timely manner. Historically, the necessary data manipulation was done with software. Software processing performed the transformations before the data was shipped to the printbar. These processes, however, are time consuming and not very efficient. It is also possible to use costly buffers for temporary storage of data until the printbar requires the information.

Various printers and methods for manipulating image data for printing on a recording medium are illustrated and described in the following disclosures which may be relevant to certain aspects of the present invention.

U.S. Pat. No. 4,779,105 to Thomson et al. describes a printer interface for a non-impact printing apparatus and more particularly to an apparatus which converts originating image data into output image data and a raster scan arrangement suitable for presentation for a printing subsystem.

U.S. Pat. No. 5,016,190 to Thomson describes a method and apparatus for converting data representative of a plurality of cells arranged independently of one another on a page into data in raster scan order for subsequent printing. Cell data for individual cells is fetched in an order dependent on the line of raster scan where the cell first appears and the bit position for the first bit representing the cell.

U.S. Pat. No. 5,084,831 to Morikawa et al. describes a printer having a memory for storing dot image data to be printed. The printer prints in two modes, the first mode being a full bit map mode for storing a page of data and a second strip map mode for a smaller amount of data than a page of data. In the full bitmap mode, the bit data is sent to the printer after all the bit data of a page has been stored in the bitmap memory. In the strip map mode, an image of one page is divided into a plurality of image portions and the bit data is written/read to and from the bitmap memory in the unit of the image portion.

U.S. Pat. No. 5,108,207 to Isobe et al. describes a printer with a variable memory size. The printer includes a memory unit having a first memory area for storing input data and a second memory area for storing image data obtained by developing input data. The first memory area and the second memory area are arranged within the same memory space to form the memory unit. An area control unit changes a proportion of the capacity of the second memory area within the memory unit to alter the relative proportions of the first memory area and the second memory area in the memory space forming the memory unit.

U.S. Pat. No. 5,303,341 to Rivshin describes a video processor for transferring a set of image data from an input device to an output device. The video processor includes a direct memory access arrangement which communicates with a memory and an integrated adapted compressor which buffers a preselected number of bytes. The direct memory access circuit includes a memory access register and a control logic circuit. The memory access register includes a first address counter and a second address counter selectively coupled to an address bus by way of a two-to-one multiplexer.

U.S. Pat. No. 5,307,458 to Freiburg et al. describes a printing machine for concurrently processing first and second sets of image data. The printing machine includes a video processor capable of processing the first set of image data, a system memory, adapted to store the second set of image data, and a bus for transmitting image data, addresses and control data.

SUMMARY OF THE INVENTION

In accordance with one aspect of the invention, there is provided a direct memory access controller for transferring image data to an output device from a memory circuit having a plurality of address locations wherein each of said address location is defined by a plurality of field values. The direct memory access controller includes a plurality of field generating circuits, each of the plurality of field generating circuits generating one of the plurality of field values. A controller is coupled to each of the plurality of field generating circuits and selects one of the plurality of field generating circuits to generate a field value.

Pursuant to another aspect of the present invention, there is provided a printer for printing a raster image having a plurality of scan lines wherein each of the plurality of scan lines includes a plurality of portions. The printer includes a bus, a printbar coupled to the bus, and a memory circuit coupled to the bus which is organized into a plurality of addressable memory locations. Each of the plurality of addressable memory locations is identified by a plurality of fields. A direct memory access controller is coupled to the bus and transfers the stored raster image from the memory circuit to the printbar over the bus. The direct memory access controller includes a plurality of field generating circuits, each of the field generating circuits generating one of the plurality of fields.

Another aspect of the present invention provides a method of transferring data directly from a memory having a plurality of memory address locations storing the data wherein each memory address location is identified by an address, to a peripheral device. The method includes the steps of generating a plural-field address comprised of a plurality of fields, wherein the plurality of fields identifies one of the memory address locations, sending the generated plural-field address to the memory, and transferring the data stored in the memory address location identified by the sent plural-field address to the peripheral device.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
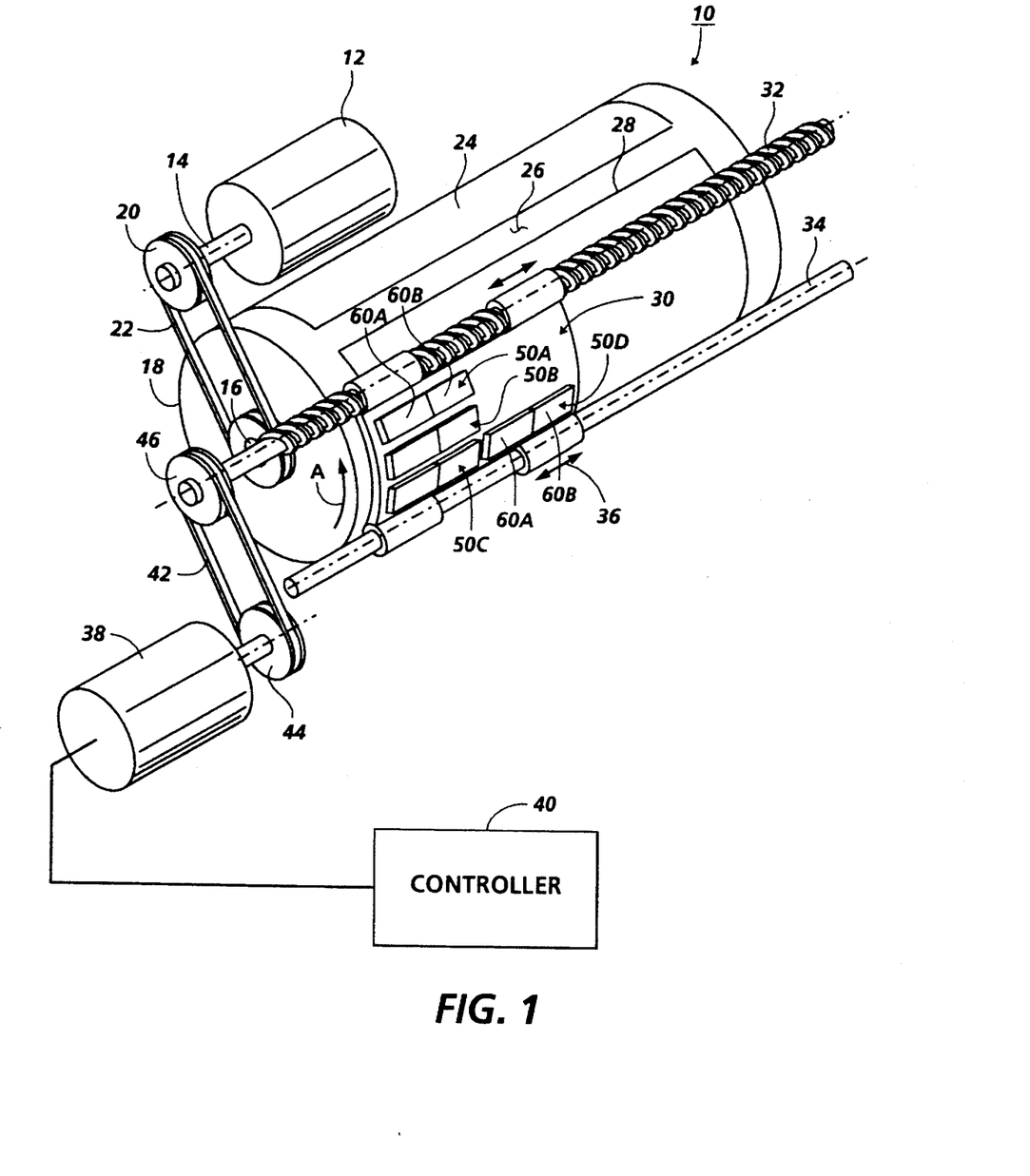
FIG. 1 illustrates a partial perspective view of a printer utilizing a plurality of partial width array printbars for thermal ink jet printing.

FIG. 1 illustrates the essential components of a printing apparatus, generally designated 10, in which the outside covers or case and associated supporting components of the printing apparatus are omitted for clarity. The printing apparatus 10 includes a motor 12 connected to a suitable power supply (not shown) and arranged with an output shaft 14 parallel to an axis 16 of a cylindrical drum 18 which is supported for rotation on bearings (not shown). A pulley 20 permits direct engagement of the output shaft 14, to a drive belt 22 for enabling the drum 18 to be continuously rotationally driven by the motor 12 in the direction of an arrow A at a predetermined rotational speed.

A recording medium 24, such as a sheet of paper or a transparency, is placed over an outer surface 26 of the drum 18, with a leading edge 28 attached to the surface 26 before printing to enable attachment of the sheet thereto either through the application of a vacuum through holes in the drum 18 (not shown) or through other means of holding such as electrostatic. As the drum 18 rotates, the sheet of paper 24 is moved past a printhead carriage 30 supported by a lead screw 32 arranged with the axis thereof parallel to the axis 16 of the drum 18 and supported by fixed bearings (not shown) which enable the carriage 30 to slidably translate axially. A carriage rail 34 provides further support for the carriage as the carriage moves in the direction of arrow 36 perpendicularly to the moving direction of the sheet 24. A second motor 38, controlled by a controller 40, drives the lead screw with a second belt 42 connecting a clutch 44 and a clutch 46 attached to the lead screw 32 for movement thereof.

The printhead carriage 30 advances a first partial width array printbar 50A, a second partial width array printbar 50B, a third partial width array printbar 50C, and a fourth partial width array printbar 50D in the direction of arrow 36 for printing on the sheet 24. The first, second and third partial width array printbars 50A–C, respectively, each print one of the colors cyan, magenta or yellow for color printing. The fourth partial width array printbar 50D prints black when necessary, especially when printing text, since process black made of cyan, magenta and yellow is not as desirable as black ink.

Each individual printbar 50A–50D include a first printhead die 60A and a second printhead die 60B butted together and mounted on a substrate (not shown) which can be made of a material such as graphite or metal. Each of the printhead dies 60A and 60B include several hundred or more nozzles which are fired sequentially in bank of nozzles. All of the printhead die are fired in parallel for one full printing of all the partial width arrays 50 on the carriage 30. This means that a straight line printed perpendicularly to the process direction A is actually composed of many portions of a line, each portion printed simultaneously which meet at the endpoints thereof. Each of the partial width arrays is also angled or tilted slightly with respect to the carriage direction 36 to compensate for the time it takes to ripple through each stroke of a single die. For a more detailed description of this feature, refer to the patent application entitled Raster Output Interface for a Printbar, Attorney Docket No. D/94455 filed concurrently with this application and incorporated herein by reference.

Figure 2:
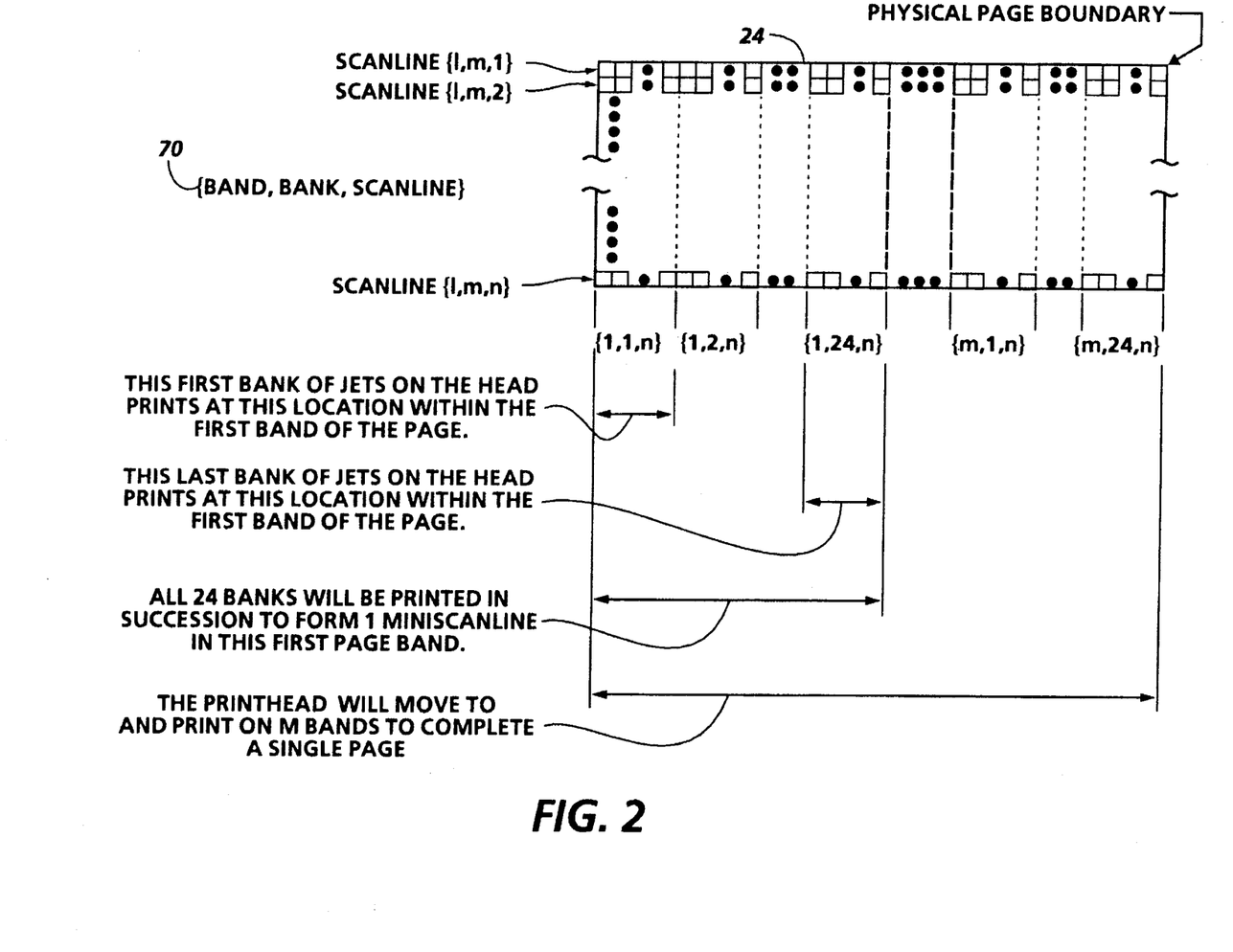
FIG. 2 is a schematic representation of the printing of a recording sheet using the present invention.

FIG. 2 illustrates an example of printing the sheet of paper 24 with the scanning carriage 30 incorporating one of the partial width arrays such as array 50D. In the present invention, a single printhead die 60 includes 384 pixel printing nozzles. Each printhead die prints a band that is parallel to the long edge of the page. Several contiguous bands (in this case 13) are printed in sequence to form a full page by stepping the carriage 30 across the page as each band is completed. Each band is composed of a plurality of partial scan lines that are as long as the length of the single printhead die, i.e., 384 pixels. Each partial scan line is printed one above the other as the printhead carriage 30 remains stationary while the drum 18 rotates. To create one mini scan line, data is shipped out as a sequence of 16 bit words. Consequently, a printhead die, which contains 384 pixels, prints 24 banks of nozzles within a single printhead die printing a single band of information. As illustrated in FIG. 2, the recording sheet 24 can be seen to be organized as a physical boundary composed of a plurality of scan lines extending across the width of the page wherein each of the scan lines is divided into a plurality of bands wherein each band is divided into a number of banks, which in this case is 24.

Since complete lines are not printed, the bitmaps arranged in scan lines must be transformed for printing. This means the printheads receive printing information in a non-linear format. Consequently, if the data space can be organized into a non-linear or multi-dimensional data space wherein the address is a catenation of the coordinates of a data word within that space, then faster transmission of raster information to a device printing in a non-raster format can be achieved. For the present embodiment, this means that the axes through the data space are the band within a page, the bank within a band, and the scan line of the individual sheet organized as an address 70 in FIG. 2. Each field, within the address 70 (band, bank or scan line) is one of the coordinates that defines the data location within the data space. In contrast, the address in a known DMA controller is a single field in which incrementing the addressing means that the absolute value of the address increases monotonically. In the non-linear direct memory access controller of the present invention, however, one or more of the field increases when the address is incremented giving rise to data streams that are actually vectors through the data space.

Figure 3:
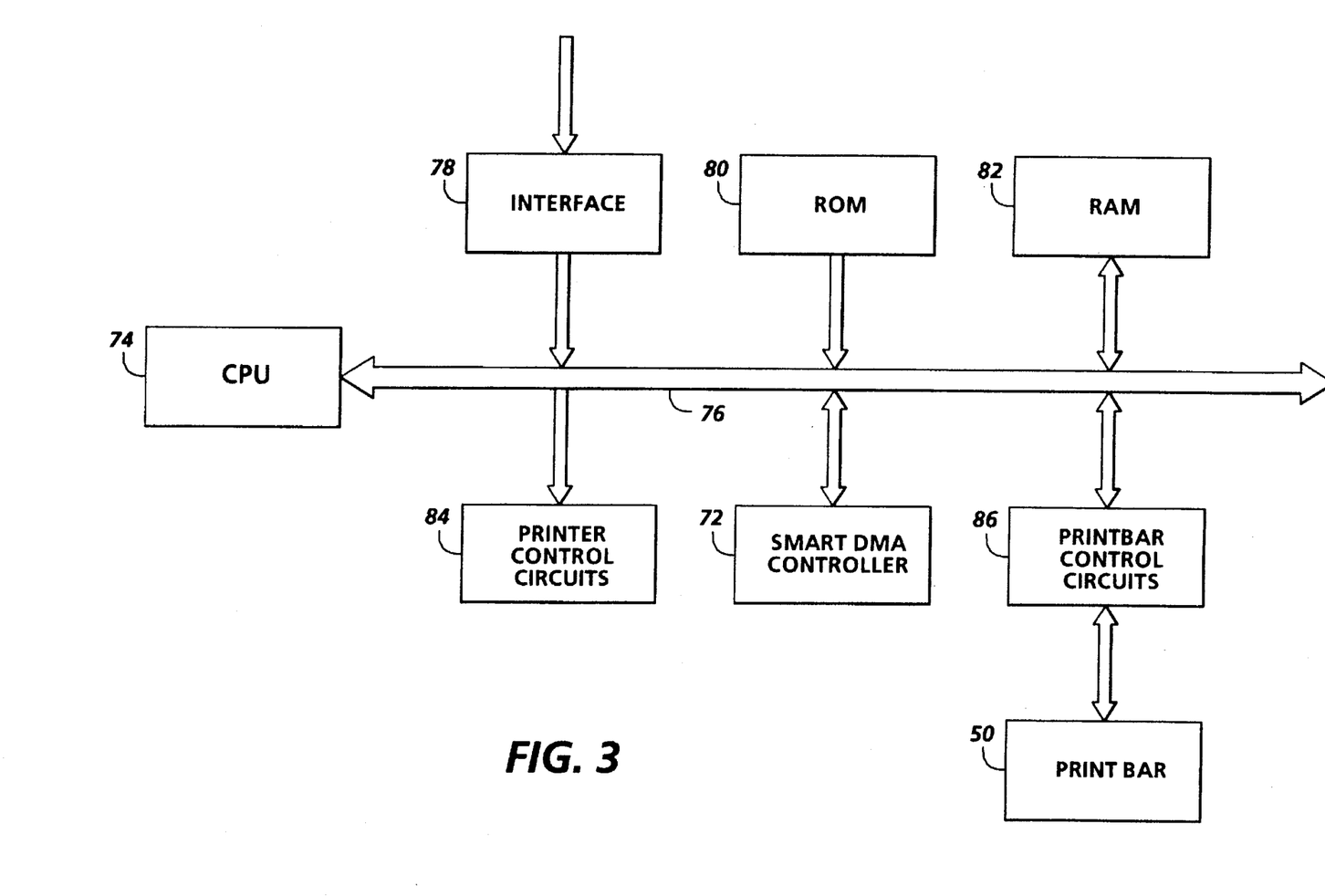
FIG. 3 is a block diagram of an electronic circuit for an ink jet printer incorporating a smart direct memory access controller of the present invention.

FIG. 3 illustrates a block diagram of the electronic circuitry of an ink jet printer incorporating a smart DMA controller 72 of the present invention. The printer includes a central processing unit or CPU 74 connected through an address/data bus 76 to an interface 78 which, in turn, is connected to an external device such as a host computer. The host computer provides information in the form of a page description language to the printer for printing. The CPU 74 is also connected to a read only memory (ROM) 80 which includes an operation program for the CPU 74. A random access memory (RAM) 82 connected to the bus 76 includes accessible data space memory, print buffers, and memory control logic for the manipulation of data and for the storage of printing information in the form of bitmaps which are generated by the printer from the received images written in page description language. The memory space, in the present embodiment, is organized as a three-dimensional space, wherein each field of the address 70 defines an X, Y or Z axis within the memory space.

In addition to the ROM 80 and the RAM 82, various printer control circuits 84 are also connected to the bus 76 for operation of the printing apparatus which includes paper feed driver circuits, as is known by those skilled in the art. The DMA controller 72 facilitates the transferal of bit-mapped information which is stored in the RAM 82 over the bus 76 to a printhead control circuit 86 also coupled to the bus 76. The printhead control circuit 86 and the printbars 50 are generally known as an image output terminal (IOT). The DMA controller 78 eliminates the need for the CPU 74 to become involved in the transferal of bit images from the RAM 82 to the printbars 50.

Figure 4:
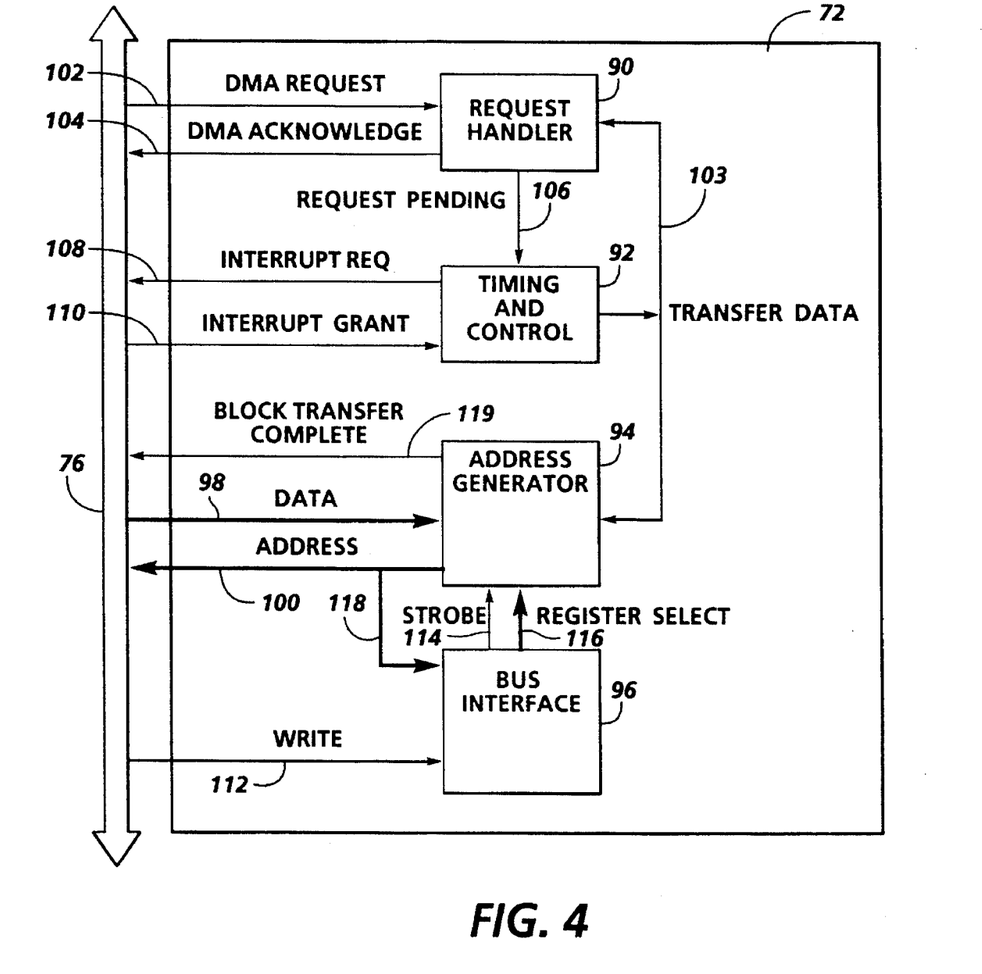
FIG. 4 is a block diagram of the smart direct memory access controller, including an address generator of the present invention.

FIG. 4 illustrates a block diagram of the DMA controller including a request handler circuit 90, a timing and control circuit 92, an address generator 94, and a bus interface circuit 96. In operation, the controller 74 initializes the DMA by sending a memory address and a number of words to be transferred over the bus 76 through a data bus 98 coupled to the address generator 94. The data bus 98 carries data information to the address generator 94, such as, the number of words to be transferred by the DMA to the printbars 50 and memory address locations where the transfer of memory begins. The address generator 94 enables the DMA controller to access information in RAM in a non-linear fashion. An address bus 100, which also couples the bus 76 to the address generator 94, transmits address location values back to the RAM 82 for accessing information therefrom.

Once the DMA interface 72 has been initalized by the CPU 74, the DMA controller 72 waits for a DMA request signal generated by the image output terminal or printbar control circuits 86 and transmitted to the request handler 90 over a line 102. The request handler 90 generates a Request Pending signal through line 106 to a timing and control circuit 92 which, in turn, makes an Interrupt Request signal pass through line 108, through bus 76 to the CPU 74. After a time governed by the internal processing of the CPU 74, the CPU 74 will grant use of the bus to the DMA controller 72 through bus 76 signal 110, Interrupt Grant. The timing and control circuit 92 will then issue a signal, Transfer Data, through line 103 to both the Request Handler 90 and the Address Generator 94. In the case of the Transfer Data signal, the Address Generator 94 will place the address of the location of data within RAM 82 on the bus, causing RAM 82 to, in turn, place data on the Data Bus portion of the bus 76. Simultaneously, the Request Handler will issue a DMA Acknowledge signal to the Printer Control Circuits 86, effecting the transfer of a word of data from the RAM 82 to the Printer Control Circuits 86. Having completed the transfer of a word of data, the Address Generator 94 will prepare for the next data word transfer by incrementing to the next address.

Figure 5:
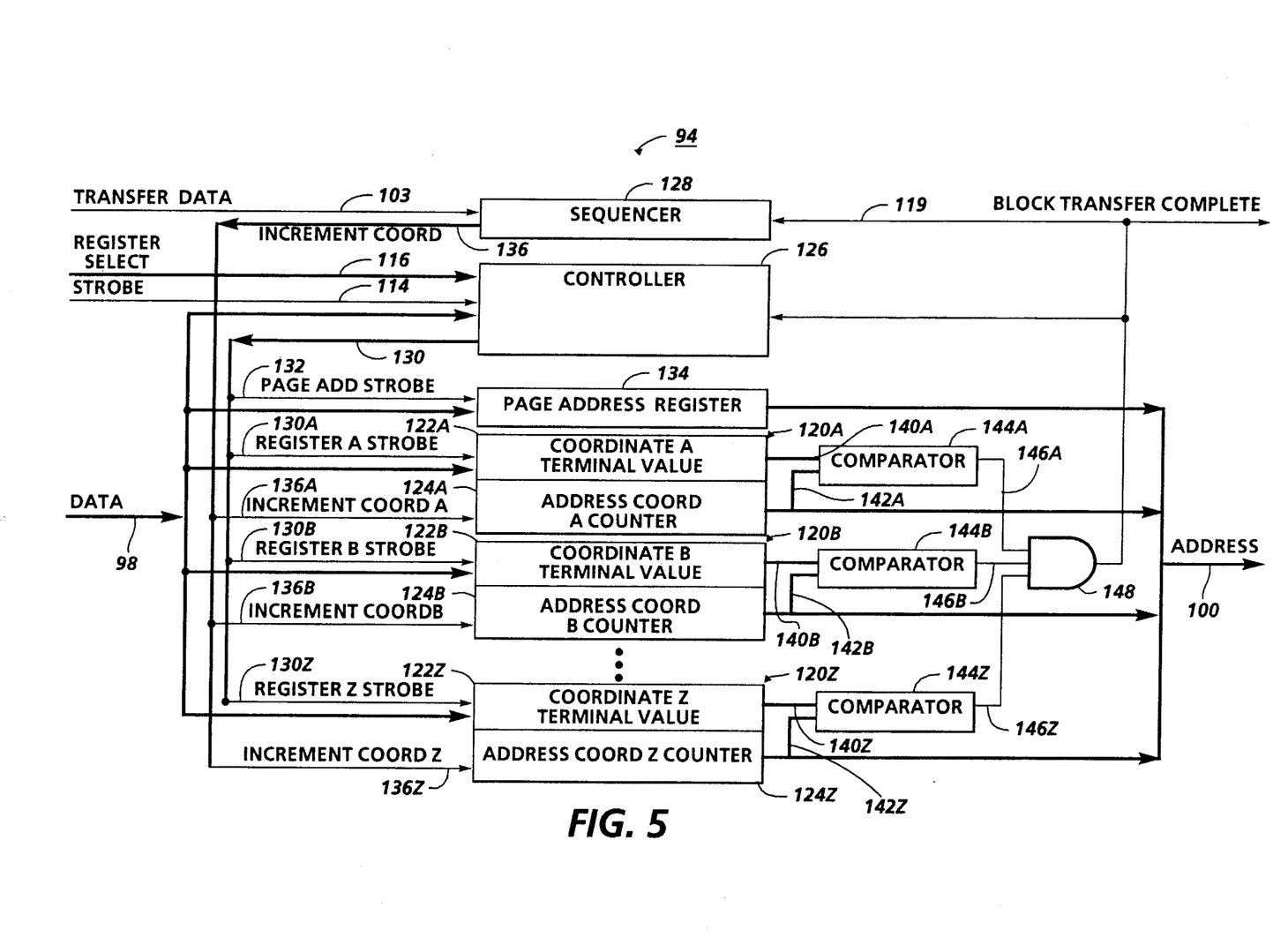
FIG. 5 is a block diagram of the address generator illustrated in FIG. 4.

As illustrated in FIG. 5, the present invention includes the address generator 94 which enables the DMA controller 72 to transfer information from the memory 82 in a non-raster format for use by the printbars 50. The address generator 94 of the present invention overcomes the limitations of known DMA controllers, by viewing the memory space 82 as a non-linear or multi-dimensional data space and the addresses as a catenation of the coordinates of the data word within the multi-dimensional space. This is different from the known DMA controllers in which the address of a memory location within the RAM 82 is a single field which is incremented one address value at a time, such that the absolute value of the address increases monotonically. In the present invention, however, the non-linear direct memory access controller 72 has a multi-dimensional addressing scheme in which addresses are plural-field addresses in which any one or more of the fields within an address can incrementally increase the address value.

To accomplish this multi-dimensional addressing scheme, the address generator 94 includes a plurality of field generating circuits 120A through 120Z, or more, depending on how many fields make up a single addressing location. In the specific embodiment 70, the address as illustrated in FIG. 2, includes three fields, a band field, a bank field, and a scan line field. Consequently, for the described embodiment, the address generator 94 requires three field generating circuits, 120A, 120B, and 120C. Of course, the address generator can include more field generating circuits than necessary in a particular embodiment, so that the smart DMA can have a wide variety of applications. Each of the field generating circuits 120 include a register or buffer 122 containing the terminal value of the corresponding field in the address. Each of the field generating circuits 120 also includes an address coordinate counter 124.

Besides the field generating circuits 120, the address generator 94 includes a controller 126 and a sequencer 128.

The controller 126 receives as input the data information received over the data bus 98, the strobe signals received over the line 114, and the register select signals received over the register select bus 116. The controller 126 in response to the data received, controls each of the field generating circuits 120 respectively with a strobe signal transmitted over a bus 130 which is coupled to each of the buffers 122 with individual lines 130A through 130Z. An additional strobe line 132 couples the controller 126 to a page address register 134 which tracks the page numbers of the addressing information being transmitted.

The sequencer 128 receives the transfer data signal over the transfer data line 103 each time a transfer of data occurs. The sequencer 128 has an output bus 136 which transmits an increment coordinate signal to the appropriate coordinate counter 124. The increment coordinate signal is coupled to each of the address counters 124A–Z through the lines 136A–Z. Typically, the sequencer 128 would be "hard wired" to execute a fixed but arbitrary sequence.

Each coordinate buffer 122 includes an output line 140 and each counter 124 includes an output line 142. Each of the corresponding output lines 140 and 142 are connected to the inputs of a respective comparator 144 which compares the signals generated to determine if the stored terminal value has been met. Once met, the comparators 144 generate output signals over a line 146, each of which are input to an AND gate 148. The output of the AND gate 148 indicates when the block transfer is complete.

The DMA controller 72, because of its ability to access the data space in a non-linear or multi-dimensional fashion, has a practical application in thermal ink jet printers and more particularly to the thermal ink jet printer illustrated in FIG. 1. As previously described in FIG. 2, the thermal ink jet printer 10, due to the use of partial width arrays consisting of two printhead dies, prints a band of information comprised of a plurality of banks of line segments on each scan line of printing. Consequently, the printing information needed to print on the individual scan lines of the physical page can be considered to have the address 70 comprised of the individual fields band, bank and scan line.

Figure 6:
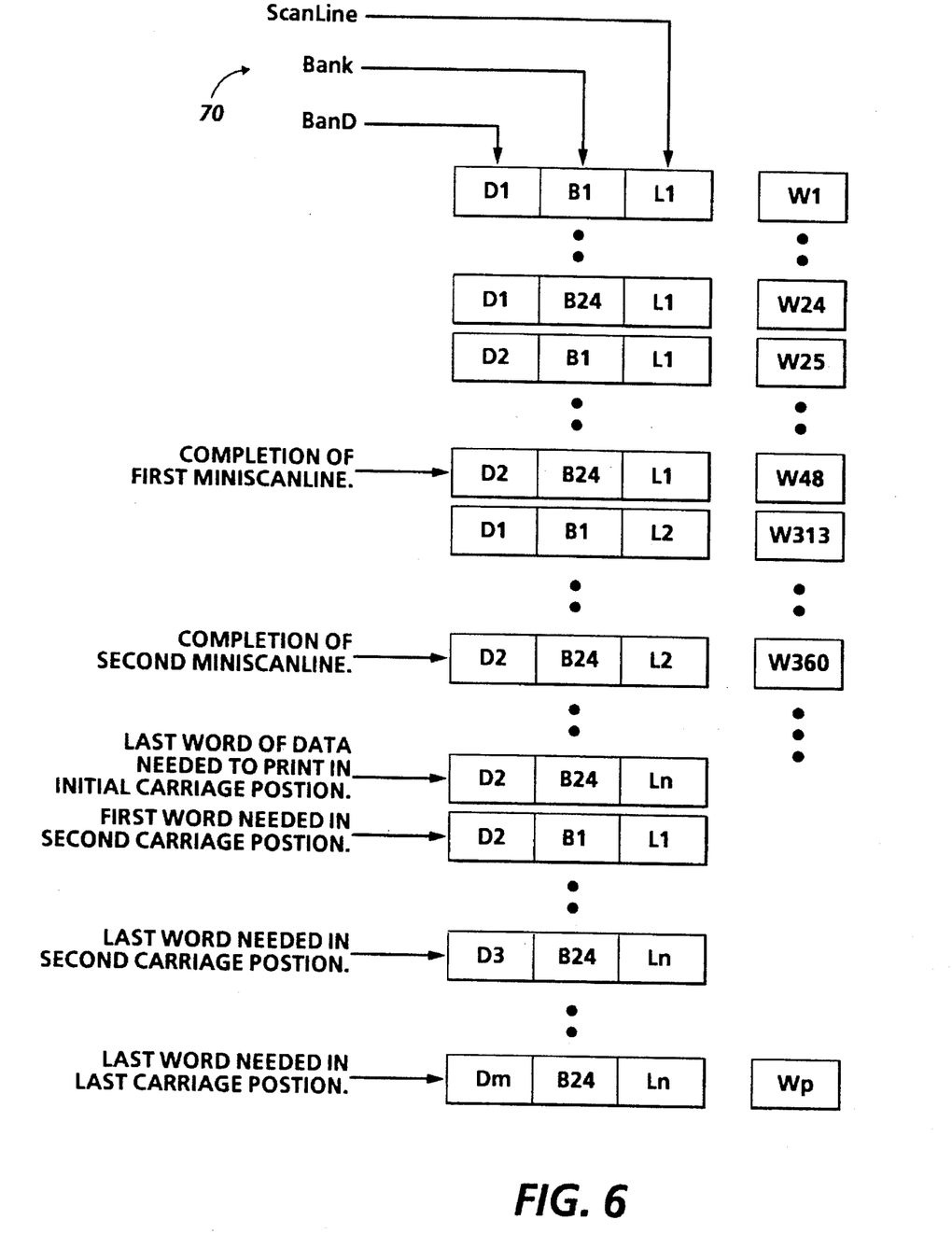
FIG. 6 is a schematic representation of the sequence followed by the direct memory access controller of the present invention for sending data to a partial width array printbar.

FIG. 6, therefore, illustrates the sequencing of the catenated addresses for the present invention when printing with the printhead carriage 30 of the printer 10. The D1, B1, L1 coordinates correspond respectively to band, bank, and scan line for the addressing scheme 70. Each of these fields of the address are incremented in a linear fashion as illustrated in FIG. 6 for printing the first mini-scan line which consists of scan line 1, and bands 1 and 2, wherein each band comprises the printing of 1 through 24 banks of the individual printhead dies.

As illustrated for the first mini scan line, coordinate L1 remains at 1 and the bank coordinate B is sequenced from 1 to 24 for each band D1 and D2. In contrast, a corresponding linear address illustrated to the right of the multi-dimensional addresses, shows the sequencing of the address if the memory space is organized as single field monotonically increasing linear addresses. As can be seen in the right-hand column, once the completion of the first mini scan line is completed at address W48, a second mini scan line is printed by jumping to the address 313. The present invention, however, prints a mini scan line by merely incrementing the scan line coordinate by 1 to L2 and again sequencing the bank coordinates from 1 to 24 for each band field of D1 and D2. Because each field in the three field address is incremented monotonically, the present invention does not require reprogramming of a controller as would be in the case of a conventional DMA controller when the linear addresses jump from W48 to W313 since the data for the next mini scan line, that is mini scan line 2, comes from a portion of the raster memory that is not contiguous with the last data accessed. The present invention, on the other hand, recognizes the multi-dimensionality of the memory so that information for the second mini scan line can be accessed by merely incrementing the scan line field of the address 70.

Once the first mini scan line has been printed, the carriage moves to a second position where the second mini scan line is printed. At this point, the band coordinates increment and the process repeats itself.

Figure 7:
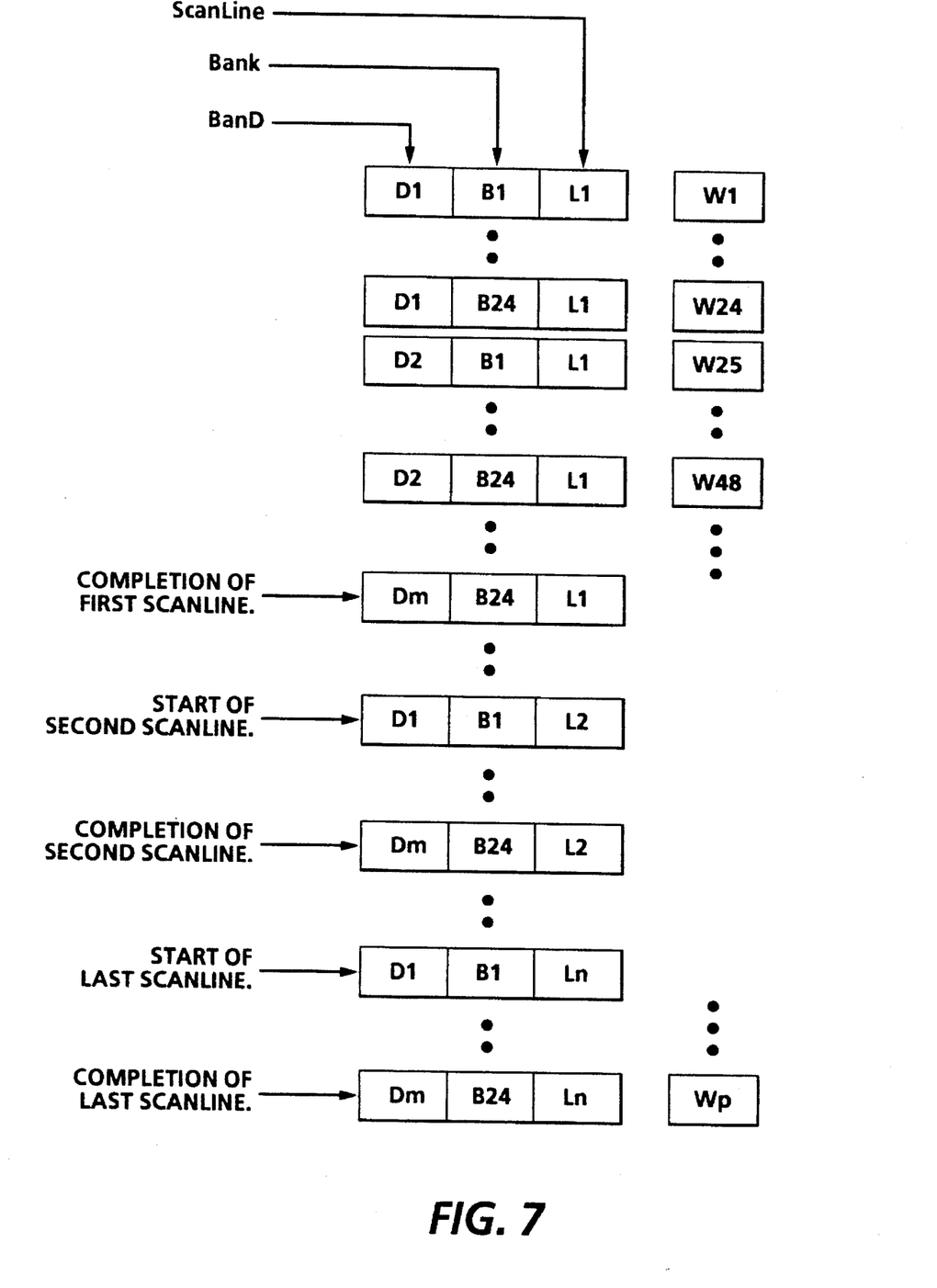
FIG. 7 is a schematic representation of the sequence followed by the direct memory access controller of the present invention for sending data to a printer where information is printed raster line by raster line.

This example illustrates how non-linear the data format can be using the present invention, for while the scan line coordinate is the most significant field within a band, the band coordinate is the most significant field within a page. The present invention is not limited to addressing schemes having 3 field addresses but can include any number of fields within an address. The present DMA controller can also be used to couple a conventional raster format data buffer to an unconventional non-raster format image output terminal, without the need for extra buffering to reformat data. The advantages include a savings in cost of memory, an ability to use existing imaging software, especially from third party vendors and the avoidance of low performance and costly lookup tables. In addition, the present invention can be used with an image output terminal which requires raster information to be loaded scan line by scan line. FIG. 7 illustrates the incrementing of the individual fields within the address space so that the present DMA controller generates addresses as would the traditional DMA controller monotonically addressing an address space as illustrated in the right hand column.

It is, therefore, apparent that there has been provided in accordance with the present invention a smart direct memory access controller for data transformation. While this invention has been described in conjunction with a specific embodiment thereof, it is evident that many alternatives modifications and variations will be apparent to those skilled in the art. For instance, the present invention is not limited to partial array thermal ink jet printbars which sequentially print segments of the printhead elements as described, but can also be effectively used with other image output terminals which print information in a non-raster format. In addition, the present invention has applications beyond printing systems. For instance, any computer system where data needs to be shipped in a non-contiguous format to meet the peculiar requirements of the system for either reading or writing the data can use the present direct memory access controller. Accordingly, the present invention is intended to embrace all such alternatives, modifications, and variations that fall within the spirit and broad scope of the appended claims.

What is claimed is:

1. A non-linear direct memory access controller for transferring data from a memory circuit having a plurality of address locations, comprising:
   a plurality of field generating circuits, each of said field generating circuits generating a field value, each of the field values being combinable to generate an address for accessing one of the plurality of address locations of the memory circuit; and
   a controller coupled to each of said plurality of field generating circuits, said controller selecting one of said plurality of field generating circuits to generate the field value.

2. The direct memory access controller of claim 1, wherein each of said plurality of field generating circuits includes a plurality of buffer circuits, each of said plurality of buffer circuits storing a terminal field value.

3. The direct memory access controller of claim 2, wherein each of said plurality of field generating circuits includes a plurality of counter circuits, each of said plurality of counter circuits associated with a corresponding one of said plurality of buffer circuits, each of said plurality of counter circuits storing one of the field values.

4. The direct memory access controller of claim 3, wherein each of said plurality of field generating circuits includes a plurality of comparator circuits associated with one of said plurality of buffer circuits and one of said plurality of comparator circuits to compare the terminal field value with the stored field value.

5. The direct memory access controller of claim 4, wherein the memory circuit defines a multi-dimensional address space wherein each of the address locations includes at least two field values.

6. The direct memory access controller of claim 5, wherein each of said plurality of comparator circuits transmit a comparison signal indicating if the terminal field value is equal to the stored field value.

7. The direct memory access controller of claim 6, wherein each of said plurality of counter circuits increments the stored field value.

8. The direct memory access controller of claim 7, further comprising a sequencer circuit, said sequencer circuit receiving a transfer data signal indicating the occurrence of a data transfer operation of the memory and transmitting an increment coordinate signal to said plurality of field counter circuits to increment the field value stored therein.

9. The direct memory access controller of claim 8, said controller receives a register select signal and the strobe signal thereby selecting one of said plurality of counter circuits to increment the stored field value.

10. The direct memory access controller of claim 9, further comprising a logic circuit coupled to said plurality of comparators, said logic gate transmitting a signal indicating that the transfer of image data from the memory is complete.

11. A printer for printing a raster image having a plurality of scan lines, each of the plurality of scan lines including a plurality of portions, comprising:
   a bus;
   a printbar coupled to said bus;
   a memory circuit coupled to said bus and organized into a plurality of addressable memory locations; and
   a non-linear direct memory access controller coupled to said bus, transferring the stored raster image from the memory circuit to said printbar along said bus, said direct memory access controller including a plurality of field generating circuits, each of said field generating circuits generating a field value, each of the field values being combinable to generate an address for accessing one of the plurality of addressable memory locations of said memory circuit.

12. The printer of claim 11, wherein said printbar includes a plurality of printhead dies, each of said printhead dies having a linear array of print nozzles, said linear array of print nozzles arranged in banks of nozzles.

13. The printer of claim 12, wherein said nozzles within said banks eject ink substantially simultaneously and said banks of nozzles within one of said printhead dies eject ink sequentially.

14. The printer of claim 13, wherein each of said addressable memory locations stores a portion of one of the plurality of scan lines.

15. The printer of claim 14, wherein each of said plurality of field generating circuits includes a buffer circuit storing a terminal field value.

16. The printer of claim 15, wherein each of said plurality of field generating circuits includes a counter circuit associated with a corresponding buffer circuit storing a field value.

17. The printer of claim 16, wherein each of said plurality of field generating circuits includes a plurality of comparator circuits associated with one of said plurality of buffer circuits and one of said plurality of comparator circuits to compare the terminal field value with the stored field value.

18. The printer of claim 17, wherein said memory circuit defines a multi-dimensional address space wherein each of the memory address locations includes at least two field values.

19. The printer of claim 18, wherein said comparison circuit transmits a comparison signal indicating if the field value is equal to the terminal value.

20. The printer of claim 9, wherein said counter circuit increments the stored field value.

21. The printer of claim 20, further comprising a sequencer circuit, said sequencer circuit receiving a transfer data signal indicating the occurrence of a data transfer operation of the memory and transmitting an increment coordinate signal to said plurality of field generating circuits to increment the field value stored therein.

22. The printer of claim 21, further comprising a controller receiving a register select signal and transmitting a strobe signal selecting one of said plurality of field generating circuits to cause a terminal value to be stored in a register.

23. The printer of claim 22, further comprising a logic circuit coupled to each of said comparators, said logic circuit transmitting a signal indicating that the transfer of image data from the memory is complete.

24. A method of transferring data directly from a memory having a plurality of memory address locations storing the data, each of the plurality of memory address locations identified by an address, to a peripheral device, comprising:

generating a plural-field address comprised of a plurality of fields with a plurality of field generating circuits, each of the field generating circuits generating one of the plurality of fields, wherein the plurality of fields identifies one of the memory address locations;

sending the generated plural-field address to the memory; and transferring the data stored in the memory address location identified by the sent plural-field address to the peripheral device.

25. The method of claim 24, further comprising comparing a terminal field value to an incremental field value for determining when a block of data has been transferred.

* * * * *